United States Patent [19]

Sawada et al.

[11] Patent Number: 4,685,357
[45] Date of Patent: Aug. 11, 1987

[54] CONTINUOUSLY VARIABLE TRANSMISSION HYDRAULIC CONTROL SYSTEM HAVING TWO PRESSURE REGULATING VALVES

[75] Inventors: Daisaku Sawada, Gotenba; Masami Sugaya; Yoshinobu Soga, both of Susono; Ryuji Imai, Toyota, all of Japan

[73] Assignee: Toyota Jidosha Kabushiki Kaisha, Aichi, Japan

[21] Appl. No.: 801,831

[22] Filed: Nov. 26, 1985

[30] Foreign Application Priority Data

Nov. 30, 1984 [JP] Japan ................. 59-254319

[51] Int. Cl.⁴ .......................................... B60K 41/16
[52] U.S. Cl. ...................... 74/867; 74/859; 74/864
[58] Field of Search ............... 474/18, 11, 28; 74/864, 74/867, 868, 859, 863

[56] References Cited

U.S. PATENT DOCUMENTS

| | | | |
|---|---|---|---|
| 4,152,947 | 5/1979 | van Deursen et al. | 474/11 |
| 4,161,894 | 7/1979 | Giacosa | 74/863 |
| 4,387,608 | 6/1983 | Mohl et al. | 74/867 X |
| 4,462,275 | 7/1984 | Mohl et al. | 474/18 X |
| 4,512,751 | 4/1985 | Tanaka et al. | 474/28 |
| 4,515,040 | 5/1985 | Takeuchi et al. | 74/859 X |
| 4,519,790 | 5/1985 | Yamamuro et al. | 474/18 |
| 4,522,086 | 6/1985 | Haley | 74/867 |
| 4,534,243 | 8/1985 | Yokoyama et al. | 74/868 |
| 4,551,119 | 11/1985 | Sugaya et al. | 474/28 |
| 4,569,254 | 2/1986 | Itoh et al. | 74/859 X |

FOREIGN PATENT DOCUMENTS

| | | |
|---|---|---|
| 48-26692 | 8/1973 | Japan . |
| 52-98861 | 8/1977 | Japan . |
| 58-160661 | 9/1983 | Japan . |
| 58-191358 | 11/1983 | Japan . |
| 61-88064 | 5/1986 | Japan . |

Primary Examiner—Leslie Braun
Assistant Examiner—Dwight G. Diehl
Attorney, Agent, or Firm—Parkhurst & Oliff

[57] ABSTRACT

A hydraulic control system for a continuously variable transmission having two variable-diameter pulleys, a belt connecting the pulleys to transmit power from one of the pulleys to the other, and corresponding cylinders for changing effective diameters of the pulleys. The control system comprises: a hydraulic source delivering a pressurized fluid; a first pressure regulating device for regulating the pressurized fluid to apply a first line pressure to one of the cylinders for controlling a tension of the belt; a flow control device for controlling flow of the fluid into and from the other cylinder to change the effective diameters of the pulleys to vary a speed ratio of the transmission; a second pressure regulating device provided between the hydraulic source and the first pressure regulating device to regulate the pressurized fluid to apply a second line pressure to the flow control device, the second line pressure being higher than a pressure in the above-indicated hydraulic cylinder or the first line pressure by a predetermined value; and a releasing device for releasing the second pressure regulating device from its regulating operation while the speed ratio of the transmission is changed with the fluid discharged from the above-indicated other cylinder, or while the speed ratio is held constant.

4 Claims, 7 Drawing Figures

CONTINUOUSLY VARIABLE TRANSMISSION HYDRAULIC CONTROL SYSTEM HAVING TWO PRESSURE REGULATING VALVES

BACKGROUND OF THE INVENTION

1. Field of the Invention

The present invention relates generally to a hydraulic control device for a continuously variable transmission of belt-and-pulley type, and more particularly to techniques for minimizing loss of drive power which is consumed for delivering a pressurized fluid from a hydraulic source to the transmission.

2. Related Art Statement

A continuously variable transmission of belt-and-pulley type is known which comprises first and second variable-diameter pulleys provided on first (input) and second (output) shaft, respectively, a transmission belt connecting the first and second variable-diameter pulleys, and first and second hydraulic cylinders to change an effective diameter of the pulleys. In such a continuously variable transmission, a ratio of a thrust of the second hydraulic cylinder (for the output shaft) to that of the first hydraulic cylinder (for the input shaft) must be changed over a relatively wide range, for example, from 1.5 to 0.5, in order to change a speed ratio of the transmission for providing output speeds over a wide range. FIG. 7 shows an example of a relation between the thrust ratio of the transmission and the speed ratio "e", i.e., the thrust ratio which must be changed according to a change in the speed ratio "e". Reference character P indicates the relation between the thrust ratio and the speed ratio "e" when a positive load torque is applied to the transmission, while reference character N indicates the relation when a negative load torque is applied to the transmission. Further, reference character M indicates the relation when no load is applied.

Such type of continuously variable transmission, uses a hydraulic control system as disclosed, for example, in Japanese Patent Application which was laid open in 1977 under Publication No. 52-98861. Such a hydraulic control system employs a single line pressure common to the first and second hydraulic cylinders. The line pressure is directly supplied to the second cylinder to maintain an optimum tension of the transmission belt. To the first cylinder, the line pressure is supplied through a flow control valve which is assigned to control a flow of the working fluid fed into the first cylinder or a flow of the fluid discharged from the first cylinder to a drain line, for example, in order to control the speed ratio "e" of the transmission. To change the thrust ratio of the first and second hydraulic cylinders over a wide range, the pressure receiving area of said first cylinder which is controlled by the flow control valve must be about twice as large as that of said second cylinder. In this arrangement, the first cylinder must have a large diameter, which leads to an increased overall size of the transmission. Further, the above arrangement causes an increased moment of inertia of the members on the first or input shaft, and requires a large amount of working fluid to change the speed ratio. Accordingly, the known hydraulic control system as described above fails to provide a satisfactory opeating response.

An alternative hydraulic control system is known which uses two line pressures i.e., first and second line pressures which are controlled by first and second pressure regulating valves, respectively. The first line pressure, which is lower than the second line pressure, is used for the previously indicated second one of the two hydraulic cylinders primarily for controlling the tension of the transmission belt. The second line pressure is applied to a flow control valve. In this type of hydraulic control system, a pressure difference between the first and second line pressures assures a relatively large difference in thrust between the two cylinders even if the two cylinders have substantially the same pressure receiving areas. A hydraulic control system of this type is disclosed in Japanese Patent Application which was published in 1973 under Publication No. 48-26692 for opposition purpose.

Problem Solved by the Invention

In the known hydraulic control system for a continuously variable transmission, wherein the first and second line pressures are used as indicated just above, the second line pressure which is higher than the first line pressure is not necessary while the thrust of said first cylinder controlled by the flow control valve is smaller than the thrust of said second cylinder, namely, while the thrust ratio is larger than 1. In this condition, an oil pump is unnecessarily operated to provide the second line pressure. This useless operation of the oil pump causes a power loss and is unfavorable. Further, while the fluid is not fed into the first cylinder, the second line pressure is not required to be applied to the first cylinder. In the known arrangement, however, the pump is operated even under such conditions of the transmission, to maintain the second line pressure. This unnecessary operation also leads to a power loss.

SUMMARY OF THE INVENTION

It is accordingly an object of the present invention to provide an improved hydraulic control system for a continuously variable transmission, which is operable with minimum power consumption, while permitting a satisfactory control of the speed ratio of the transmission over a wide range.

According to the present invention, there is provided a hydraulic control system for a continuously variable transmission having first and second variable-diameter pulleys provided on first and second shafts, a transmission belt connecting the first and second pulleys to transmit power from one of the first and second pulleys to the other, and a pair of hydraulic cylinders for changing an effective diameter of the pulleys engaging the belt, the hydraulic control system comprising:

a hydraulic source delivering a pressurized fluid;
a first pressure regulating device for regulating the pressurized fluid to apply a first line pressure to one of the hydraulic cylinders for controlling a tension of the transmission belt;
a flow control device for controlling flows of the fluid into and from the other hydraulic cylinder, thereby changing the effective diameters of the pulleys to vary a speed ratio of the transmission;
a second pressure regulating device provided between the hydraulic source and the first pressure regulating device and regulating the pressurized fluid to apply a second line pressure to the flow control device, the second line pressure being higher than a pressure in the above-indicated other hydraulic cylinder or the first line pressure by a predetermined value; and releasing means for releasing the second pressure regulating device from its pressure regulating operation while the speed ratio of the transmission is changed with the fluid discharged from the above-indicated other hydraulic cylinder, or while the speed ratio is held constant.

In the hydraulic control system constructed according to the invention as described above, the pressure of the fluid which is supplied from the hydraulic source to the flow control device is regulated by the second pressure regulating device, such that the pressure applied to the flow control device is higher by the predetermined value than the pressure in the above-identified hydraulic cylinder, or the first line pressure. Consequently, the pressurized fluid from the hydraulic source can be fed into the above-indicated other hydraulic cylinder via the flow control device. Therefore, even if the two hydraulic cylinders have substantially the same pressure receiving areas, the two cylinders may be operated over a sufficiently wide range of thrust ratio (at a suitable thrust ratio). Further, the second pressure regulating device controls the pressurized fluid from the hydraulic source, so that the pressure to be applied to the flow control device is at a minimum level required to provide a necessary thrust ratio of the two hydraulic cylinders. Hence, the instant hydraulic control system may operate to control the transmission with a minimum power loss.

In addition, the releasing means serves to stop a pressure regulating operation of the second pressure regulating device when the speed ratio of the transmission is changed with the fluid discharged from the above-indicated other hydraulic cylinder, or when the speed ratio is held constant. In these conditions of the transmission, it is not necessary to apply the second line pressure to the above-indicated other hydraulic cylinder. Hence, the releasing means which releases the second pressure regulating device from its operation to regulate the second line pressure contributes to avoiding a power loss due to unnecessary pressure regulating operation of the second pressure regulating device under such conditions of the transmission.

According to an advantageous embodiment of the invention, the second pressure regulating device comprises means for defining a cylinder bore, and a valve spool which is slidably received within the bore and is movable between an open position in which the first and second pressure lines communicate with each other and a closed position in which the first and second pressure lines are disconnected from each other, the valve spool having a first pressure receiving surface which receives the second line pressure to move the valve spool toward its open position and a second pressure receiving surface which receives the first line pressure to move the valve spool toward its closed position. The releasing means comprises a check valve connected between the flow control device and the above-indicated other hydraulic cylinder to prevent the fluid from flowing therethrough in a direction from the above-indicated other hydraulic cylinder toward the flow control device, and further comprises a restrictor which is connected to a connection line between the flow control device and the check valve and which permits the fluid in the connection line to be drained, the second pressure receiving surface of the valve spool receiving the pressure in the connection line.

According to another advantageous embodiment of the invention, the second pressure regulating device comprises the valve spool described above, and the releasing means comprises a solenoid-operated shut-off valve disposed in a connection line which connects the second pressure regulating device and a first pressure line for applying the first line pressure to the above-indicated one hydraulic cylinder, the first line pressure being applied to the second pressure receiving surface of the valve spool through the connection line, the releasing means further comprising a restrictor which is connected to the connection line and which permits the fluid in the connection line to be drained, the solenoid-operated shut-off valve being closed while the speed ratio of the transmission is changed with the fluid discharged from the above-indicated other hydraulic cylinder, or while the speed ratio is held constant.

According to a further advantageous embodiment of the invention, the second pressure regulating device comprises means for defining a cylinder bore, and a valve spool which is slidably received within the bore and is movable between an open position in which the first and second pressure lines communicate with each other and a closed position in which the first and second pressure lines are disconnected from each other, the valve spool having a first pressure receiving surface which receives the second line pressure to bias the valve spool toward its open position, a second pressure receiving surface which receives the first line pressure to bias the valve spool toward its closed position, and a third pressure receiving surface which receives a pressure in the other hydraulic cylinder to bias the valve spool toward its closed position. The the releasing means comprises a restrictor connected between the second pressure regulating device and a first pressure line for applying the first line pressure to the one hydraulic cylinder, and further comprises a solenoid-operated shut-off valve which is connected to a connection line between the restrictor and the second pressure regulating device and which permits the fluid in the connection line to be drained, the solenoid-operated shut-off valve being open while the speed ratio of the transmission is changed with the fluid discharged from the above-indicated other hydraulic cylinder, or while the speed ratio is held constant.

BRIEF DESCRIPTION OF THE DRAWINGS

The above and other objects, features and advantages of this invention will be better understood from reading the following detailed description of preferred embodiments of the invention, when considered in conjunction with the accompanying drawings, in which.

Figure 1:
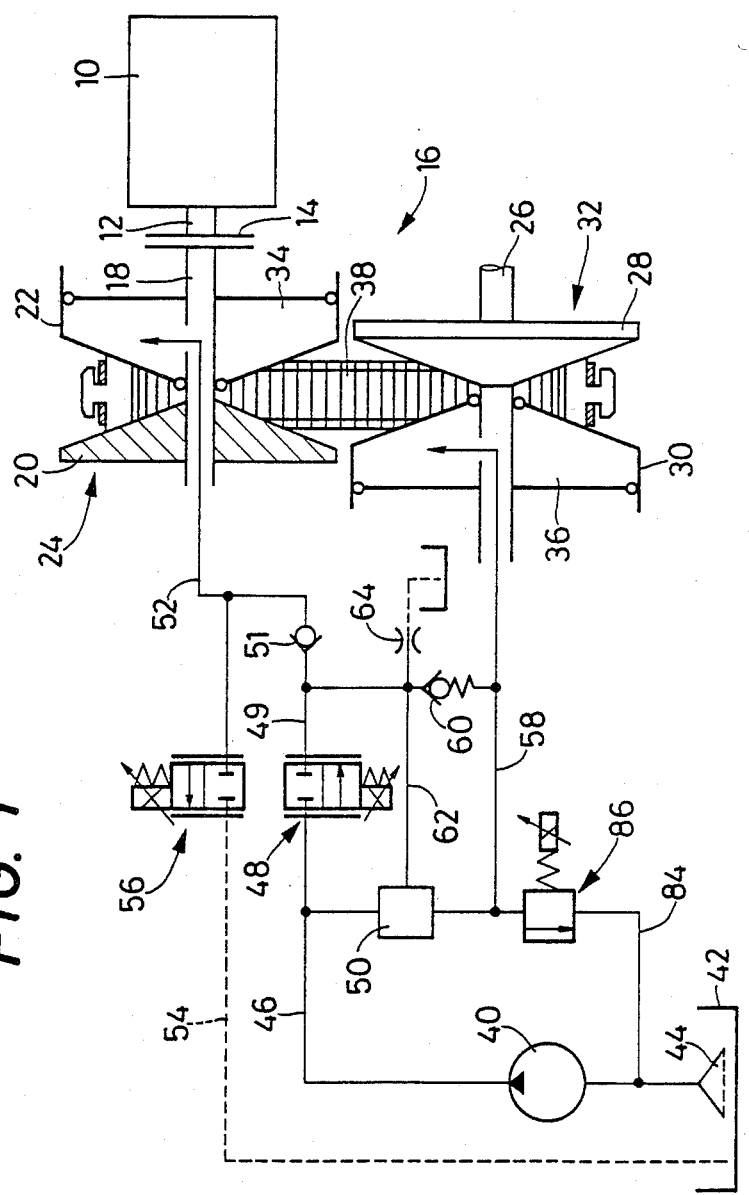
FIG. 1 is a schematic hydraulic circuit diagram of one embodiment of a hydraulic control system of the present invention.

There is shown in FIG. 1 one embodiment of a hydraulic control system for an automotive vehicle with an engine 10. The engine 10 has a crank shaft 12 which is connected to a first shaft (input or drive shaft) 18 of a continuously variable transmission 16 of belt-and-pulley type (hereinafter abbreviated as "CVT"), via a clutch 14 such as an electromagnetic or centrifugal clutch, or a fluid coupling. The first shaft 18 is provided with a stationary rotor 20 fixed thereto, and an axially movable rotor 22. The rotor 22 is movable on the first shaft 18 in the axial direction, but not rotatable relative to the first shaft 18. The stationary and movable rotors 20, 22 cooperate to constitute a first variable-diameter pulley 24 having a V-groove whose width is variable. Namely, the variable-diameter pulley 24 is adapted such that its effective diameter engaging a transmission belt 38 (which will be described) is variable. The CVT 16 further has a second shaft (output or driven shaft) 26 has a stationary rotor 28 fixed thereto, and an axially movable rotor 30 similar to the rotor 22. These rotors 28, 30 cooperate to constitute a second variable-diameter pulley 32. The movable rotor 22 of the first variable-diameter pulley 24 is moved axially of the first shaft 18 by a first hydraulic cylinder 34, while the movable rotor 30 of the second variable-diameter pulley 32 is moved axially of the second shaft 26 by a second hydraulic cylinder 36. The first and second hydraulic cylinders 34 and 36 have substantially the same pressure-receiving areas, and the first and second variable-diameter pulleys 24 and 32 have substantially the same diameter. The pulleys 24, 32 are connected by transmission belt 38 which is usually made up of an endless hoop, and a multiplicity of blocks arranged along the hoop. A rotary motion of the engine 10 transmitted to the first shaft 18 is imparted to the second shaft 26 through the transmission belt 38, and then transmitted to drive wheels of the vehicle via an auxiliary transmission and a final drive unit (final reduction gear), both of which are not shown.

As a hydraulic source for the first and second hydraulic cylinders 34, 36, there is provided a pump 40 which is operatively connected to the crank shaft 12 through a connection rod (not shown) which extends through the first shaft 18 of the CVT 16, whereby the pump 40 is driven by the engine 10. The pump 40 pumps up a working fluid from an oil reservoir 42 through a strainer 44, and delivers the pressurized fluid to a flow control servo valve 48 and to a pressure regulating valve 50 through a second pressure line 46. The flow control servo valve 48 is a two-way valve connected to the first hydraulic cylinder 34 through a line 49, a check valve 51 and a line 52. The check valve 51 prevents the working fluid from flowing therethrough in a direction toward the flow control servo valve 48. The flow control servo valve 48 is designed primarily for controlling a flow of the working fluid from the second pressure line 46 to the first hydraulic cylinder 34. Between the line 52 and a drain conduit 54 is connected a flow control servo valve 56 similar to the servo valve 48. This second flow control servo valve 56 is designed primarily for controlling a flow of the working fluid from the first hydraulic cylinder 34 into the oil reservoir 42. The two flow control servo valves 48 and 56 are selectively operated in response to signals from a controller (not shown) in order to change the effective diameter of the first variable-diameter pulley 24, whereby a speed ratio "e" of the CVT 16 (speed of the second shaft 26 over that of the first shaft 18) is adjusted. As described in Japanese Patent Application No. 57-40747 filed in 1982, the controller supplies the first and second flow control servo valves 48, 56 with the control signals adapted to establish a speed rato "e" of the CVT 16 which will cause an actual speed of the engine 10 to coincide with a target speed that is determined based on an amount of operation of an accelerator pedal of the vehicle. In this embodiment, the flow control servo valves 48, 56 constitute a flow control device, and the drain conduit 54 and a return line 84 (which will be described) constitute a drain line.

The previously indicated pressure regulating valve 50 serves as a second pressure regulating device which controls a flow of the working fluid from the second pressure line 46 into a first pressure line 58, and thereby regulates a second line pressure in the second pressure line 46 so that the second line pressure is higher than a pressure in the first hydraulic cylinder 34 by a predetermined value. A relief valve 60 is connected between the line 49 and the first pressure line 58, to prevent a pressure differential therebetween from exceeding a predtermined upper limit. The pressure between the relief valve 60 and the check valve 51 is applied to the pressure regulating valve 50 through a line 62, to permit a normal pressure regulating operation of the valve 50, which will be described below. At the same time, the line between the relief valve 60 and the check valve 51 is connected to a drain through a restrictor 64.

Figure 2:
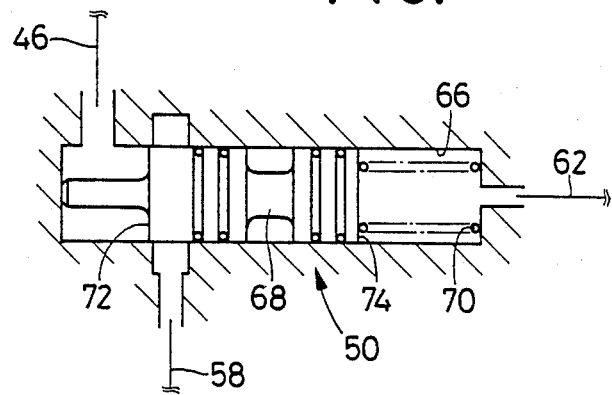
FIG. 2 is a cross sectional view of a pressure regulating valve used in the embodiment of FIG. 1.

As illustrated in detail in FIG. 2, the pressure regulating valve 50 comprises a valve spool 68 which is axially slidably received in a cylinder bore 66 which communicates with the second pressure line 46, first pressure line 58 and line 62. The valve spool 68 is movable between an open position in which the first and second pressure lines 58 and 46 communicate with each other, and a closed position in which the two pressure lines 58, 46 are disconnected from each other. The valve spool 68 is biased by a spring 70 toward its closed position. That is, the valve 50 is a normally-closed, two-way valve. The valve spool 68 has a first pressure-receiving surface 72 which receives the second line pressure in a direction that will cause the spool 68 to move against a biasing force of the spring 70, i.e., toward the open position. The valve spool 68 further has a second pressure-receiving surface 74 which receives the pressure in the first hydraulic cylinder 34 via the line 62 and thereby moves the spool 68 toward its closed position. With the first and second pressure-receiving surfaces 72 and 74 receiving the respective pressures, the valve spool 68 is located at a position at which a thrust on the first pressure-receiving surface 72 is equal to a sum of a thrust on the second pressure-receiving surface 74 and the biasing force of the spring 70. Thus, an area of communication between the first and second pressure lines 58, 46 is controlled by the pressure regulating valve 50. Stated more specifically, the valve spool 68 is moved to an equilibrium position at which the following equation (1) is satisfied:

$$P2 \times A = P3 \times B + F \tag{1}$$

where,

A: area of first pressure-receiving surface 72
B: area of second pressure-receiving surface 74
P2: pressure in second pressure line 46
P3: pressure in first hydraulic cylinder 34
F: biasing force of spring 70

As the pressure P3 in the first hydraulic cylinder 34 is lowered, the area of communication between the first and second pressure lines 58, 46 is increased, and the flow of the fluid form the second pressure line 46 into the first pressure line 58 is increased, whereby the second line pressure P2 is lowered. Conversely, as the pressure P3 in the first hydraulic cylinder 34 is raised, the communication area between the first and second pressure lines 58, 46 is reduced, and the second line pressure P2 is raised. In this manner, the second line pressure P2 is changed following the pressure P3 in the first hydraulic cylinder 34 so that the second line pressure P2 is higher than the pressure P3 by the predetermined differential ($\Delta P = P2 - P3$). Therefore, the predetermined pressure differential $\Delta P$ exists across the flow control servo valve 48 even if the speed ratio "e" of the CVT 16 is changed, unless the first line pressure P1 exceeds the second line pressure P2. In this specific embodiment, the first and second pressure-receiving areas A and B are equal, and therefore the pressure differential $\Delta P$ is determined by F/A according to the equation (1).

In the return line 84 connecting the first pressure line 58 and the suction side of the pump 40, there is provided a first pressure regulating device in the form of a solenoid-operated pressure control servo valve 86 which is designed to control a flow of the fluid from the first pressure line 58 into the return line 84, and thereby regulate the pressure in the first pressure line 58. As disclosed, for example, in Japanese Patent Application No. 57-071467 (filed in 1982), the pressure control servo valve 86 is controlled by a controller (not shown) which produces a control signal determined based on the current speed ratio "e" and transmission torque of the CVT 16, so that the first line pressure in the line 58 is controlled at a permissible lowest level which does not allow the transmission belt 38 to slip on the pulleys 24, 32.

Figure 3:
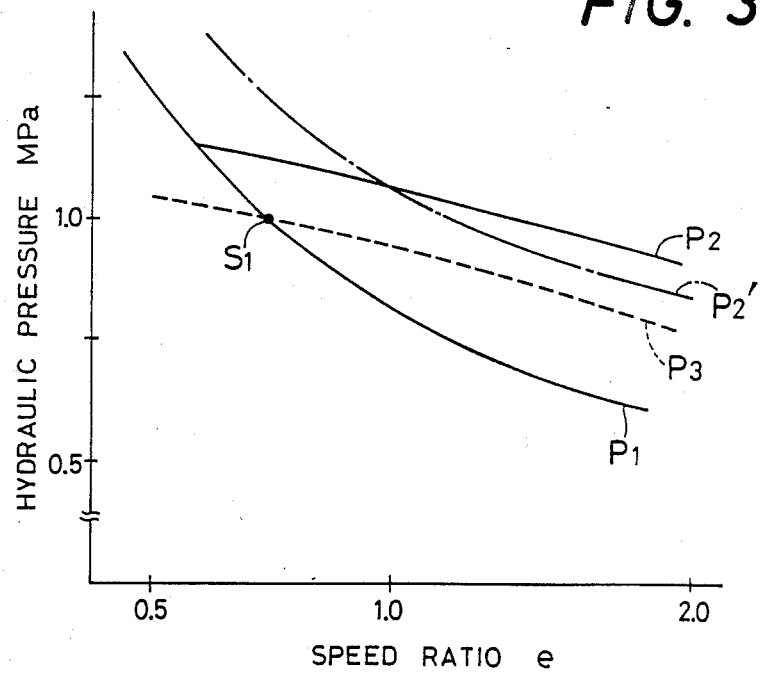
FIG. 3 is a graphical representation of the operation of the embodiment of FIG. 1, showing changes in pressure at different points in the circuit in relation to a speed ratio of a continuously variable transmission.

The operation of the present hydraulic control system will be described. As shown in FIG. 3, the first line pressure P1 is changed by the pressure control servo valve 86 which is operated in response to a change in the speed ratio "e" of the CVT 16. Thus, a force of the second variable-diameter pulley 32 with which the transmission belt 38 is gripped or squeezed is controlled so as to give the transmission belt 38 a necessary and sufficient tension. In response to the current tension of the transmission belt 38, the pressure P3 in the first hydraulic cylinder 34 is changed corresponding to the tension of the belt 38 and other conditions. This pressure P3 is applied to the pressure regulating valve 50 through the line 52, check valve 51 and lines 49 and 62, while the check valve 51 is open, that is, while the fluid is flowing in a direction from the line 49 toward the line 52. As the pressure P3 in the first hydraulic cylinder 34 is lowered, the pressure regulating valve 50 operates to increase a flow of the fluid from the second pressure line 46 into the first pressure line 58. Conversely, the pressure regulating valve 50 operates to reduce the fluid flow from the second pressure line 46 into the first pressure line 58 as the pressure P3 is raised. In this manner, a predetermined pressure differential $\Delta P$ is maintained between the second line pressure P2 and the pressure P3 in the first hydraulic cylinder 34. As a result, the pressure regulating valve 50 serves to maintain the pressure differential $\Delta P$ across the flow control servo valve 48. The regulation of the second line pressure P2 in this way will give the CVT 16 a suitable thrust ratio of the first and second hydraulic cylinders 34, 36, over a wide range of the speed ratio "e", even with the first and second hydraulic cylinders 34, 36 having substantially the same pressure receiving areas. In other words, the speed ratio "e" of the CVT may be controlled or varied over a comparatively wide range.

As is apparent from the above description, the second line pressure P2, i.e., the output pressure of the pump 40, is controlled by the pressure regulating device 50 to be higher than the pressure P3 in the first hydraulic cylinder 34 by the predetermined value ($\Delta P$), as indicated in FIG. 3. That is, the output pressure of the pump 40 is maintained at a required minimum level corresponding to the current speed ratio "e" of the CVT 16. Therefore, power loss of the engine 10 due to activation of the pump 40 is minimized, and consequently the fuel economy of the vehicle is maximized. In this connection, it is noted that power loss of the engine 10 is excessive when the pressure differential $\Delta P$ exceeds an upper limit, while the CVT 16 fails to obtain a sufficient difference in thrust between the first and second hydraulic cylinders 34, 36 if the pressure differential $\Delta P$ is smaller than a lower limit. Based on experiments conducted by the inventors, it is preferred to maintain the pressure differential $\Delta P$ within a range of 0.1–0.5 (MPa), and to determine the biasing force of the spring 70 and/or the pressure receiving areas of the valve spool 68 so that the pressure differential $\Delta P$ is held within the above-specified range.

When the speed ratio "e" of the CVT 16 is smaller than 1, the first line pressure P1 may possibly exceed the pressure P3 in the first hydraulic cylinder 34. This may happen, for example, when the speed ratio "e" becomes smaller than a point S1 indicated in FIG. 3. In this event, in spite of the operation of the pressure regulating valve 50 to establish the pressure differential $\Delta P$ across the flow control servo valve 48, the first line pressure P1 in the first pressure line 58 downstream of the valve 50 becomes equal to or higher than the second line pressure P2 in the second pressure line 46 upstream of the valve 50. Nevertheless, the pressure P3 in the first hydraulic cylinder 34 will not be raised with the first line pressure P1, as indicated on the left side of point S1 in FIG. 3, since the pressure P3 is determined by the tension of the transmission belt 38, the speed ratio "e" and transmission torque of the CVT 16, etc.

The pressure regulating valve 50 should be operated to regulate the second line pressure P2 when it is necessary to feed the fluid from the second pressure line 46 to the first hydraulic cylinder 34 through the flow control servo valve 48 for increasing the speed ratio "e". However, the regulation of the second line pressure P2 is not necessary when the fluid is not supplied to the first hydraulic cylinder 34 through the flow control servo valve 48. Namely, the pressure regulating valve 50 is not required to regulate the second line pressure P2 while the speed ratio "e" is reduced with the fluid in the first hydraulic cylinder 34 being discharged through the flow control servo valve 56, or while the speed ratio "e" is kept constant without the fluid kept in the first hydraulic cylinder 34. Under these conditions of the transmission, the pressure regulating operation of the pressure regulating valve 50 is stopped by releasing means which consists of the check valve 51 and the restrictor 64 (throttling valve). In this connection, it is noted that the relief valve 60 may be eliminated and does not constitute an essential element of the releasing means, because it is used to release the pressure in the line 49 into the first pressure line 58 when the pressure in the line 49 is excessively high.

Described more particularly, while the flow control valve 48 is closed and the fluid does not flow into the first hydraulic cylinder 34, the lines 49, 62 are held closed at the flow control valve 48, check valve 51 and relief valve 60. However, the restrictor 64 permits the pressure in the lines 49, 62 to be released into the drain. As a result, the valve spool 68 of the pressure regulating valve 50 is freed from the pressure P3 in the hydraulic cylinder 34, which has been applied to the second pressure receiving surface 74 of the spool 68. Therefore, the valve spool 68 is moved to its open position against the biasing force of the spring 70, whereby the first and second pressure lines 58 and 46 are brought into communication with each other. Consequently, the second line pressure P2 is lowered down to the level of the first line pressure P1. Thus, the pump is not required to maintain the second line pressure P2 while the speed ratio "e" of the CVT 16 is reduced or kept constant. Hence, power of the engine 10 is further saved.

Modified embodiments of the present invention will be described referring to FIGS. 4 and 5. The same reference numerals as used in FIG. 1 are used in these figures to identify the corresponding elements of the modified embodiments. In the interest of brevity and simplification, repeated description of these elements will not be provided.

Figure 4:
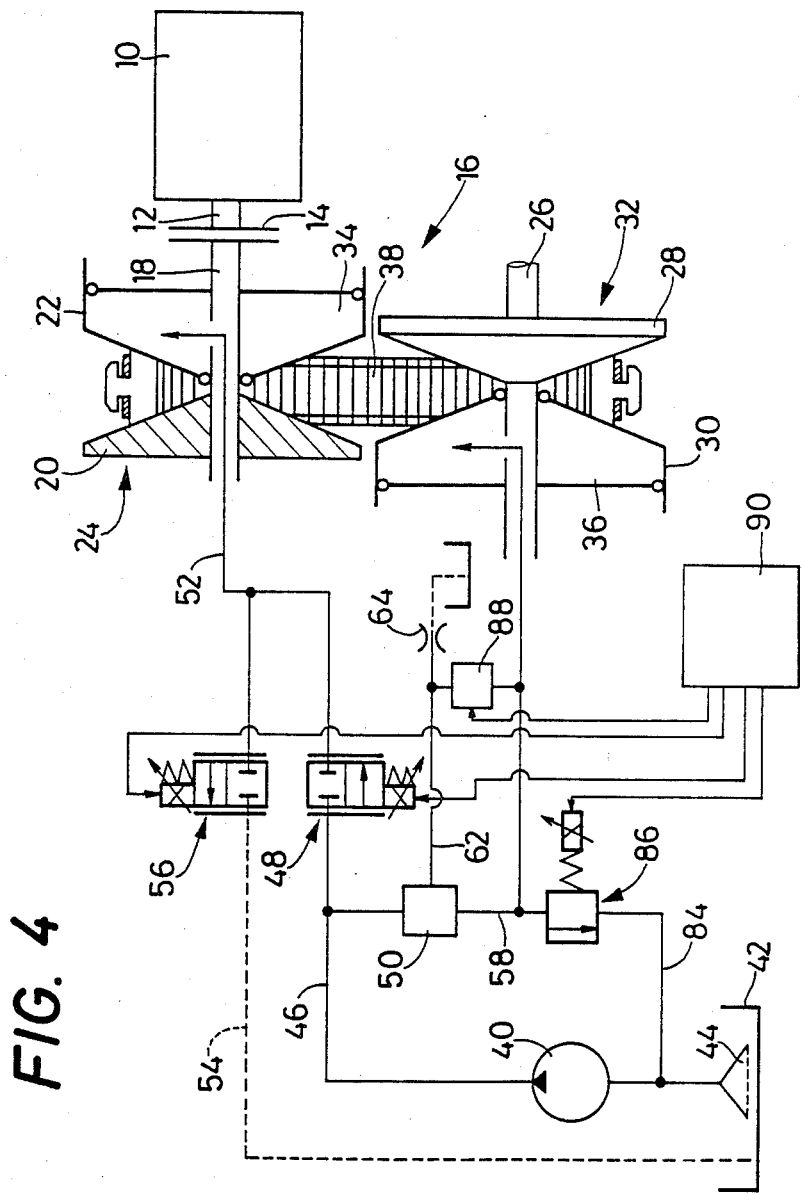
FIGS. 4 and 5 are views corresponding to FIG. 1, showing other embodiments of the invention.

The modified embodiment of FIG. 4 is different from the preceding embodiment, in that the check valve 51, and the line which connects the line 49 between the check valve 51 and the flow control servo valve 48, with the relief valve 60, are not provided. Instead, a solenoid-operated shut-off valve 88 is provided in place of the relief valve 60 of the preceeding embodiment. The shut-off valve 88 is operated between its open and closed position under the control of a microcomputer, such that the shut-off valve 88 is placed in its open position when the speed ratio "e" of the CVT 16 is increased, and in its closed position when the speed ratio "e" is reduced or held constant, that is, when the fluid is not discharged from the first hydraulic cylinder 34.

In the above modified embodiment, while the speed ratio "e" is increased and the solenoid-operated shut-off valve 88 is open, the pressure regulating valve 50 is normally operated to regulate the second line pressure P2' so as to be higher than the first line pressure P1 by a predetermined value. Thus, the pressure regulating valve 50 maintains a pressure differential (P2'−P3) across the flow control servo valve 48. This pressure regulating operation makes it possible to reduce power loss to a minimum as in the preceeding embodiment. While the speed ratio "e" of the CVT 16 is held constant or reduced, the solenoid-operated shut-off valve 88 is closed by the microcomputer. As a result, the fluid in the line 62 is drained through the restrictor 64 (the line 62 is exposed to a substantially atmospheric pressure). Consequently, the valve spool of the pressure regulating valve 50 is moved to its open position, whereby the first and second pressure lines 58 and 46 are connected to each other, permitting the second line pressure P2' to be lowered to the level of the first line pressure P1 as in the preceding embodiment. Thus, power loss due to maintenance of the second line pressure P2' at an unnecessarily high level is eliminated. According to the present modified embodiment, the restrictor 64 and the solenoid-operated shut-off valve 88 constitute releasing means for releasing the pressure regulating valve from its pressure regulating operation.

Figure 5:
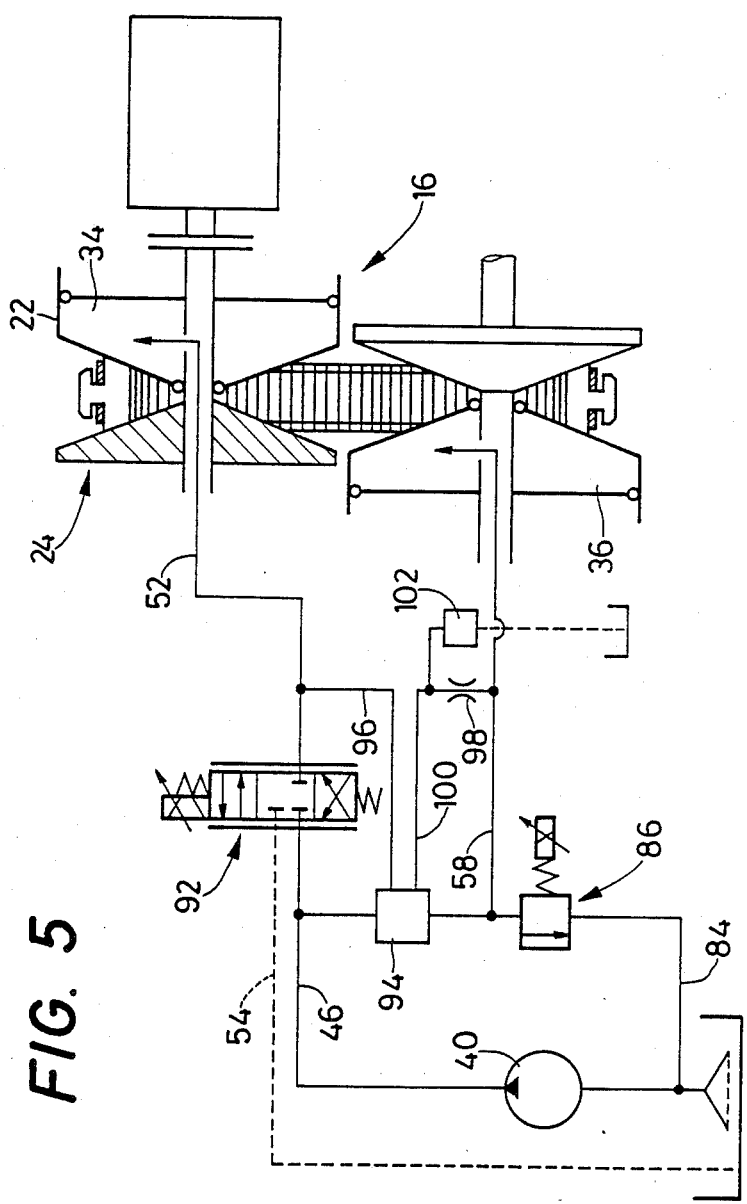

Another modified embodiment is shown in FIG. 5, wherein a three-way flow control servo valve 92 is provided to effect selective communication of the line 52 with the second pressure line 46 and the drain line 54. At the same time, the flow control servo valve 92 controls flow of the fluid into and from the first hydraulic cylinder 34. The second line pressure is regulated by a pressure regulating valve 94 to which the pressure in the first hydraulic cylinder 34 is applied through the line 52 and a line 96. Further, the pressure regulating valve 94 receives the first line pressure through a restrictor 98 and a line 100. A solenoid-operated shut-off valve 102 is connected to the line 100, so that the fluid in the line 100 may be drained. Contrary to the solenoid-operated shut-off valve 88 in the preceding embodiment, the shut-off valve 102 is placed in its open position while the speed ratio "e" of the CVT 16 is held constant or reduced.

Figure 6:
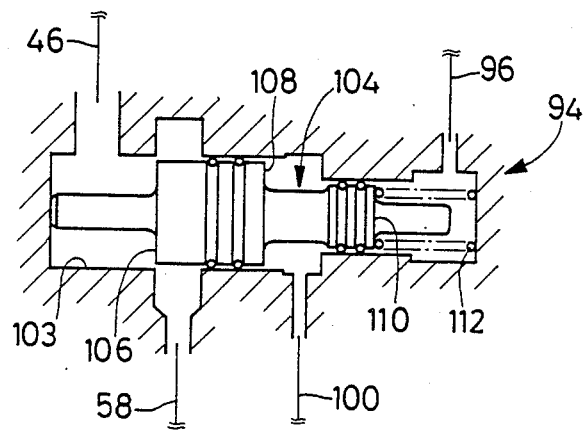
FIG. 6 is a cross sectional view corresponding to FIG. 2, showing a pressure regulating valve used in the embodiment of FIG. 5.
Figure 7:
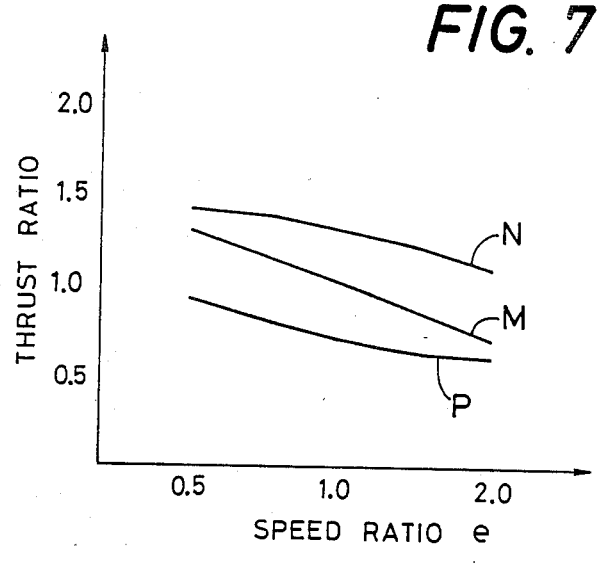
FIG. 7 is a graph illustrating changes in thrust ratio of the continuously variable transmission of FIG. 1 in relation to its speed ratio. DETAILED DESCRIPTION OF THE PREFERRED EMBODIMENTS To further clarify the concept of the present invention, several preferred embodiments of the invention will be described in detail by reference to figures of the appended drawings.

The pressure regulating valve 94 is constructed as disclosed in Japanese Patent Application No. 59-208964 (filed in 1984). Described in greater detail referring to FIG. 6, the valve 94 comprises a valve spool 104 which is slidably received in a bore 103. The valve spool 104 has a first pressure receiving surface 106 which receives the second line pressure P2, a second pressure receiving surface 108 which receives the first line pressure P1, and a third surface receiving pressure 110 which receives the pressure P3 in the first hydraulic cylinder 34. The valve spool 104 is moved to an equilibrium position at which the following equation (2) is satisfied:

$$P2 \times A = P1 \times P3 \times C + F \qquad (2)$$

where,
A: area of first pressure receiving surface 106
B: area of second pressure receiving surface 108
C: area of third pressure receiving surface 110
F: biasing force of spring 112

With the valve spool 104 moved according to the above equation, a predetermined pressure differential (P2−P3) is established across the flow control servo valve 92. Further, the pressure regulating valve 94 prevents an excessive rise of the second line pressure P2 when the movable rotor 22 of the first variable-diameter pulley 24 is moved its full stroke in a direction to reduce the speed of the pulley 24.

While the speed ratio "e" of the CVT 16 is held constant or reduced, the solenoid-operated shut-off valve 102 is open, and consequently the first line pressure P1 in the line 100 between the restrictor 98 and the pressure regulating valve 94 is released through the open shut-off valve 102. Namely, a force represented by the second term of the right member of the equation (2) which has been applied to the valve spool 104 in a direction toward its closed position, is removed, and the valve spool 104 is moved to its open position against the biasing action of the spring 112. As a result, the second pressure line 46 is brought into communication with the first pressure line 58, and the second line pressure P2 is lowered down to the level of the first line pressure P1. Thus, power loss of the engine 10 is avoided. In this embodiment, the restrictor 98 and the solenoid-operated shut-off valve 102 constitute the releasing means for stopping the pressure regulating operation of the pressure regulating valve 94.

While the present invention has been described in its preferred embodiments with a certain degree of particularity, it is to be understood that the invention is not confined to the precise disclosure of the illustrated embodiments, but may be embodied with various changes and modifications which may occur to those skilled in the art, without departing from the spirit and scope of the invention defined in the appended claims.

What is claimed is:

1. A hydraulic control system for a continuously variable transmission having first and second variable-diameter pulleys provided on a first and a second shafts, a transmission belt connecting the first and second pulleys to transmit power from one of the first and second pulleys to the other, and a pair of hydraulic cylinders for changing an effective diameter of the pulleys engaging the belt, said hydraulic control system comprising:

a hydraulic source delivering a pressurized fluid;

a first pressure regulating device for regulating the pressurized fluid to apply a first line pressure to one of said hydraulic cylinders for controlling a tension of the transmission belt;

flow control means for controlling flow of the fluid into the other hydraulic cylinder and flow of the fluid from said other hydraulic cylinder, thereby changing the effective diameters of the pulleys to vary a speed ratio of the transmission;

a second pressure regulating device provided between said hydraulic source and said first pressure regulating device, and regulating said pressurized fluid to apply a second line pressure to said flow control means, said second line pressure being higher than a pressure in said other hydraulic cylinder or said first line pressure by a predetermined value; and releasing means for releasing said second pressure regulating device from its pressure regulating operation while said speed ratio of the transmission is changed with the fluid discharged from said other hydraulic cylinder, or while said speed ratio is held constant.

2. A hydraulic control device according to claim 1, wherein said second pressure regulating device comprises means for defining a cylinder bore, and a valve spool which is slidably received within said bore and is movable between an open position in which said first and second pressure lines communicate with each other and a closed position in which said first and second pressure lines are disconnected from each other, said valve spool having a first pressure receiving surface which receives said second line pressure to move the valve spool toward its open position and a second pressure receiving surface which receives the pressure in said other hydraulic cylinder to move the valve spool toward its closed position, and wherein said releasing means comprises a check valve connected between said flow control device and said other hydraulic cylinder to prevent the fluid from flowing therethrough in a direction from said other hydraulic cylinder toward said flow control device, and further comprises a restrictor which is connected to a connection line between said flow control device and said check valve and which permits the fluid in said connection line to be drained, said second pressure receiving surface of said valve spool receiving the pressure in said connection line.

3. A hydraulic control device according to claim 1, wherein the second pressure regulating device comprises means for defining a cylinder bore, and a valve spool which is slidably received within said bore and is movable between an open position in which said first and second pressure lines communicate with each other and a closed position in which said first and second pressure lines are disconnected from each other, said valve spool having a first pressure receiving surface which receives said second line pressure to move the new valve spool toward its open position and a second pressure receiving surface which receives said first line pressure to move the valve spool toward its closed position, and wherein said releasing means comprises a solenoid-operated shut-off valve disposed in a connection line which connects said second pressure regulating device and a first pressure line for applying said first line pressure to said one hydraulic cylinder, said first line pressure being applied to said second pressure receiving surface of said valve spool through said connection line, said releasing means further comprising a restrictor which is connected to said connection line and which permits the fluid in said connection line to be drained, said solenoid-operated shut-off valve being closed while said speed ratio of the transmission is changed with the fluid discharged from said other hydraulic cylinder, or while said speed ratio is held constant.

4. A hydraulic control device according to claim 1, wherein said second pressure regulating device comprises means for defining a cylinder bore, and a valve spool which is slidably received within said bore and is movable between an open position in which said first and second pressure lines communicate with each other and a closed position in which said first and second pressure lines are disconnected from each other, said valve spool having a first pressure receiving surface which receives said second line pressure to bias the valve spool toward its open position, a second pressure receiving surface which receives said first line pressure to bias the valve spool toward its closed position, and a third pressure receiving surface which receives a pressure in said other hydraulic cylinder to bias the valve spool toward its closed position, and wherein said releasing means comprises a restrictor connected between said second pressure regulating device and a first pressure line for applying said first line pressure to said one hydraulic cylinder, and further comprises a solenoid-operated shut-off valve which is connected to a connection line between said restrictor and said second pressure regulating device and which permits the fluid in said connection line to be drained, said solenoid-operated shut-off valve being open while said speed ratio of the transmission is changed with the fluid discharged from said other hydraulic cylinder, or while said speed ratio is held constant.

* * * * *